June 1, 1954 T. GOODWIN 2,680,025

TAPE RECORDER AND PLAYBACK MACHINE

Filed Sept. 27, 1950 5 Sheets-Sheet 1

INVENTOR
Thomas Goodwin
BY Darby & Darby
ATTORNEYS,

TAPE RECORDER AND PLAYBACK MACHINE

Filed Sept. 27, 1950 5 Sheets-Sheet 2

INVENTOR
Thomas Goodwin
BY Darby & Darby
ATTORNEYS.

INVENTOR
Thomas Goodwin
BY Darby & Darby
ATTORNEYS,

June 1, 1954 T. GOODWIN 2,680,025

TAPE RECORDER AND PLAYBACK MACHINE

Filed Sept. 27, 1950 5 Sheets-Sheet 4

INVENTOR
Thomas Goodwin
BY Darby & Darby
ATTORNEYS.

June 1, 1954 T. GOODWIN 2,680,025

TAPE RECORDER AND PLAYBACK MACHINE

Filed Sept. 27, 1950 5 Sheets-Sheet 5

INVENTOR
Thomas Goodwin
BY Darby & Darby
ATTORNEYS.

Patented June 1, 1954 2,680,025

UNITED STATES PATENT OFFICE 2,680,025

TAPE RECORDER AND PLAYBACK MACHINE

Thomas Goodwin, Baldwin, N. Y., assignor to J. C. Warren Corporation, Bellmore, N. Y., a corporation of New York Application September 27, 1950, Serial No. 186,963

2 Claims. (Cl. 274—11)

This invention relates to a playback or recording unit for magnetic tape machines and is particularly directed to a mechanism for employing multitrack continuous loop tapes in recording and playback machines.

Tape recorders have the virtue that a number of sound tracks can be put on a single tape and the danger of inadvertent erasure eliminated. For a successful multitrack tape recorder or playback unit it is essential that it provide for a plurality of tracks which can be accurately aligned and passed through a playing head and also that the playing head be coupled with appropriate mechanism for selecting the track desired. Where a plurality of tracks are to be put on a single tape advantages accrue from being able to run the tape through the machine at a relatively high rate of speed and yet provide lengthy recordings or playbacks on recorded lengths of tape.

It is accordingly a fundamental object of the invention to provide a tape recorder or playback unit having mechanism for driving a tape record therethrough and selecting a desired track from a plurality on the said tape.

It is a second object of the invention to provide a mechanism by which a tape record can be used for lengthy continuous playback.

It is another object of the invention to provide mechanism for selecting a particular track in a tape recorder or playback unit.

It is a further object of the invention to provide for automatic shifting fron one track to an adjacent one upon the completion of the playing of the recording on the first track.

Other objects and advantages of the invention will in part be obvious and in part appear hereinafter from the description of the details of a preferred embodiment of the invention.

The invention thus comprises a magnetic tape recorder or playback unit characterized by its facility for accepting a continuous loop of tape for recording a plurality of sound tracks or carrying a plurality thereof and having in combination a mount for receiving the loop, a guide for the tape and a head for selecting the sound track, together with drive mechanism for the tape, tripping mechanism between the head and the driving mechanism to cause the head to select a track upon completion of one and, upon completion of all the tracks on a given tape, to revert back to a starting position. The invention thus is embodied in a sound recording or playback unit having the features of construction, combination of elements and arrangements of parts characterized as mechanism for recording and playing sound track on a tape which will be described in greater detail hereinafter and claimed in the accompanying claims.

For a clear understanding of the nature of the invention broadly and in detail in the specific embodiment thereof, reference should be had to the accompanying drawings illustrating the invention in its several aspects, in which, Figure 1 is a rear view of the machine showing the arrangement and location of the driving motor, driving mechanism, tripping mechanism and clutch on the back portion of the chassis which accepts the device;

*The general structure of the device*

Figure 1:
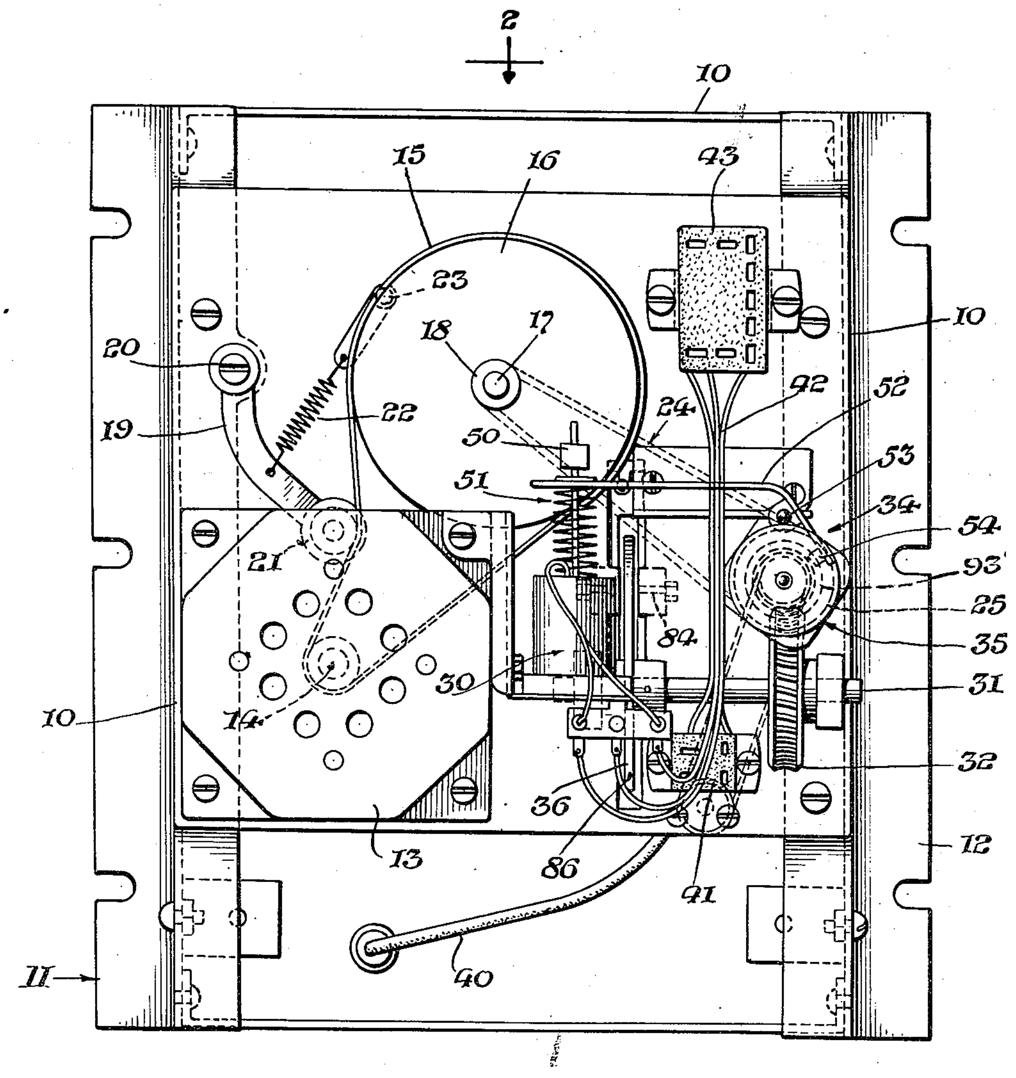
Figures 2, 3:
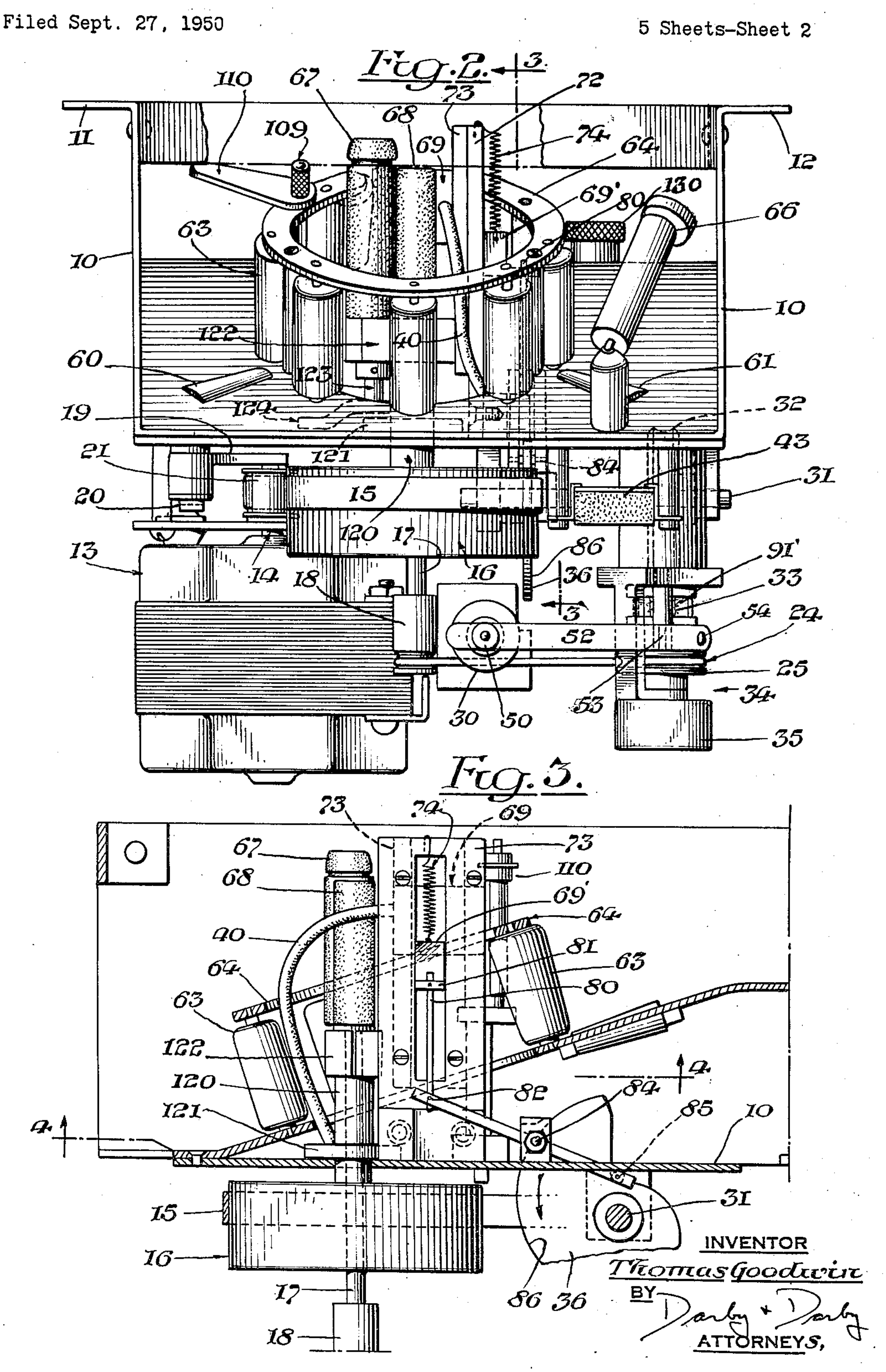
Figure 2 is a top elevation of the device observed in the direction indicated by the arrow marked 2 in Figure 1, which elevation shows the outline of the chassis, a top view of the motor, tripping and driving mechanisms, as well as a perspective of the tape receiving mechanism and head as they appear from the inclination given to the portion of the chassis on which this mechanism is mounted.
Figure 3 is a section through the machine taken along the line 3—3 in Figure 2 and shows the relation of the chassis carrying the tape roll, the head, and the selective cam mechanism for positioning the head.

The general structure showing the combination of parts and their relationship to each other is best followed by a consideration of the views in Figures 1 and 2 prior to examination of additional figures for details of the device.

In Figure 1, 10 represents the chassis of the apparatus, which it will be seen has outturned sides 11 and 12 for mounting in a case or cover unit of any desired variety. On the chassis, drive motor 13 is connected to shaft 14 and belt 15 which passes around flywheel 16 mounted on the chassis by means of shaft 17, which in turn carries a smaller pulley 18. To provide positive engagement between drive motor 13 and the flywheel 16 arm 19 is pivoted at point 20 and carries roller 21 which is forced into engagement with belt 15 by spring 22 mounted between the arm 19 and point 23 on the chassis.

From pulley 18 motive power is transmitted by belt 24 to pulley 25 which serves to activate a cam and worm gear arrangement to be set forth in greater detail in connection with the subsequent figures.

These several elements are readily identified in Figure 2 where motor 13 is seen mounted in a standoff position from the chassis and shaft 14 drives belt 15 which passes over flywheel 16 on shaft 17 extending out from the chassis, so that pulley 18 is readily accessible. Belt 24 driven thereby engages pulley 25 in the worm gear arrangement, also mounted in a standoff position from the chassis.

Figures 7, 8, 9:
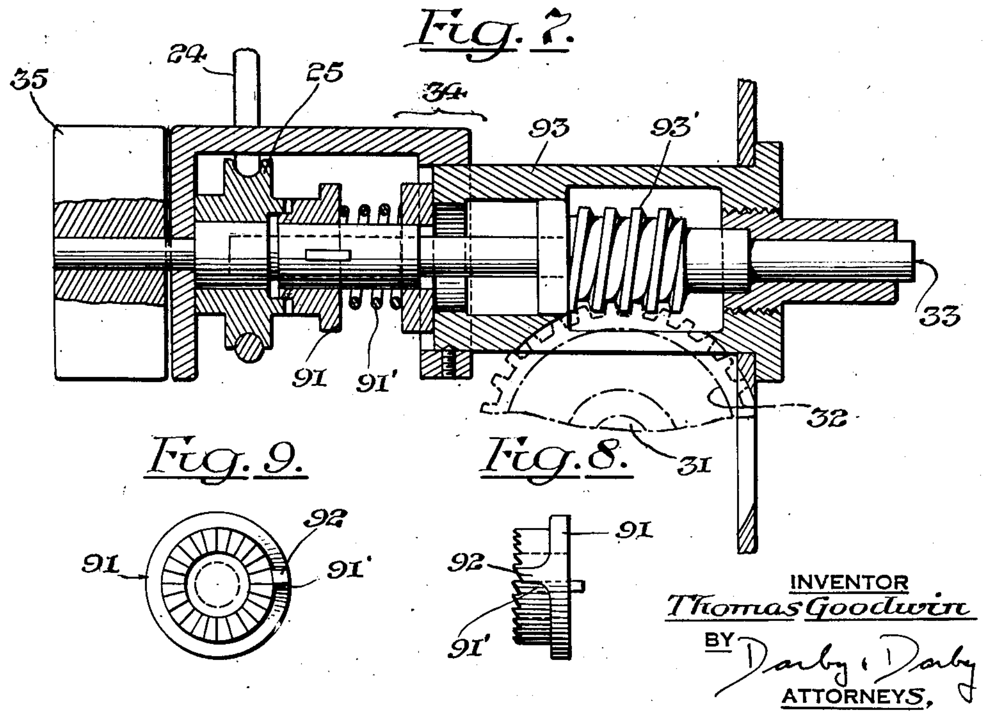
Figure 7 is a vertical section through the clutch mechanism shown in Figure 2 and illustrating the gear and wheels for operating the said mechanism.
Figure 8 is a detailed view of one of the clutch members and Figure 9 is a face view of that same member.

Shown also in Figure 1 is the mechanism for tripping and engaging the worm gear drive device. Thus 30 represents a solenoid trip mounted in fixed relation to shaft 31, which carries gear 32, in turn coupled to the worm gear unit driven by pulley 25. Details of this mechanism will be seen more clearly in Figure 2 where the top elevation thereof is given. It is seen that pulley 25 is carried on a common shaft 33 with the worm gear mechanism comprising unit 34 and flywheel 35. The details of this mechanism are shown in Figure 8 and its operation will be set forth in connection therewith.

In both Figures 1 and 2, shaft 31 through gear 32 is shown coupled to the worm gear in unit 34 and the involute shaped cam 36 appears mounted on shaft 31. The detailed coupling of the said cam with the head is set forth in Figure 10.

The remaining portions of Figure 1 are a pictorial representation of electrical connections, of which 40 represents a cable connection to the playing head bringing the electrical pick-up signal to plug 41 for further connection to amplifying means. Solenoid 30 is connected by wires 42 to plug 43 which in turn provides for a connection to power supply and a speaker unit.

Visible in Figure 1 is the pivoted arm 52 which is held in raised position by spring 51 and coupled to the solenoid by plunger 50. The arm is pivoted at point 53 and operates to trip the device to move the head from one track to another across the tape. Pivot arm 52 carries at its extreme end, extension 54 for engaging the tooth of the clutch mechanism driven by the worm gear arrangement, and is shown in elevation and in some detail in Figures 8 and 11.

*The general arrangement of parts on the base of the apparatus*

Figure 6:
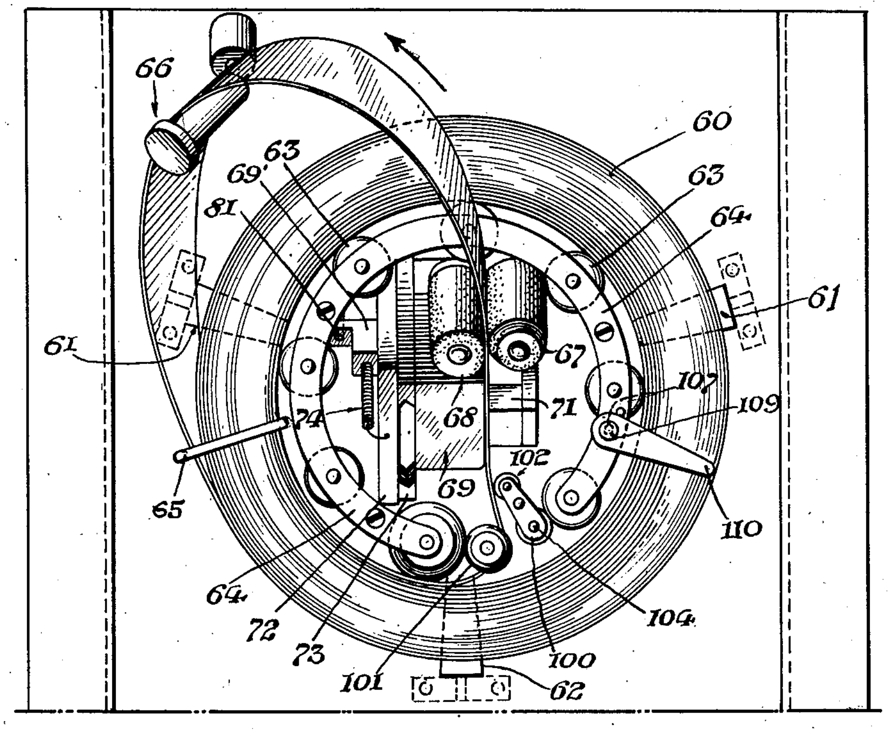
Figure 6 is a front elevation of the device showing the several parts mounted on the chassis and a tape roll in place with the tape being fed through the playing head.

Figures 2 and 6, the first a top elevation of the device and Figure 6 a front elevation showing a playing tape in place, are best read together to obtain an understanding of the operation of that portion of the device dealing with the tape roll mount.

In Figure 2 chassis 10 is shown slightly inclined, fundamentally to provide a bed on which the tap roll 60 can rest, and in the chassis are mounted a plurality of truncated conical rollers 61—62, on which the edge of a continuous roll of tape rests and travels as it is fed from one side to the other, forming a receiving unit for a roll of tape. A plurality of rollers 63 is provided, each being mounted with its longitudinal axis essentially perpendicular to that face of the chassis and being held in a circular relation by face plate 64. Retainer 70 serves to hold a roll of tape neatly in place on the unit. Guide roller 66 is mounted at an upper corner of the chassis to guide the loop of tape from the head to the outside of the tape roll.

Tape retaining ring 70 is formed as a rectangular loop, through which the roll of tape is held, one end thereof being extended and fitted onto the chassis of the machine.

Within the tape holding unit drive rollers 67 and 68 pull the tape down past the head 69 where pressure pad 71 serves to hold the tape closely adjacent to the head. Head support 72 is mounted on the chassis and carries a V groove track arrangement 73 in which the head 69 may travel laterally across the width of a tape to select the desired track. The detailed structure of this head and pressure pad mechanism is shown, together with the cam selecting unit in Figure 10.

Figures 10, 11, 12, 13:
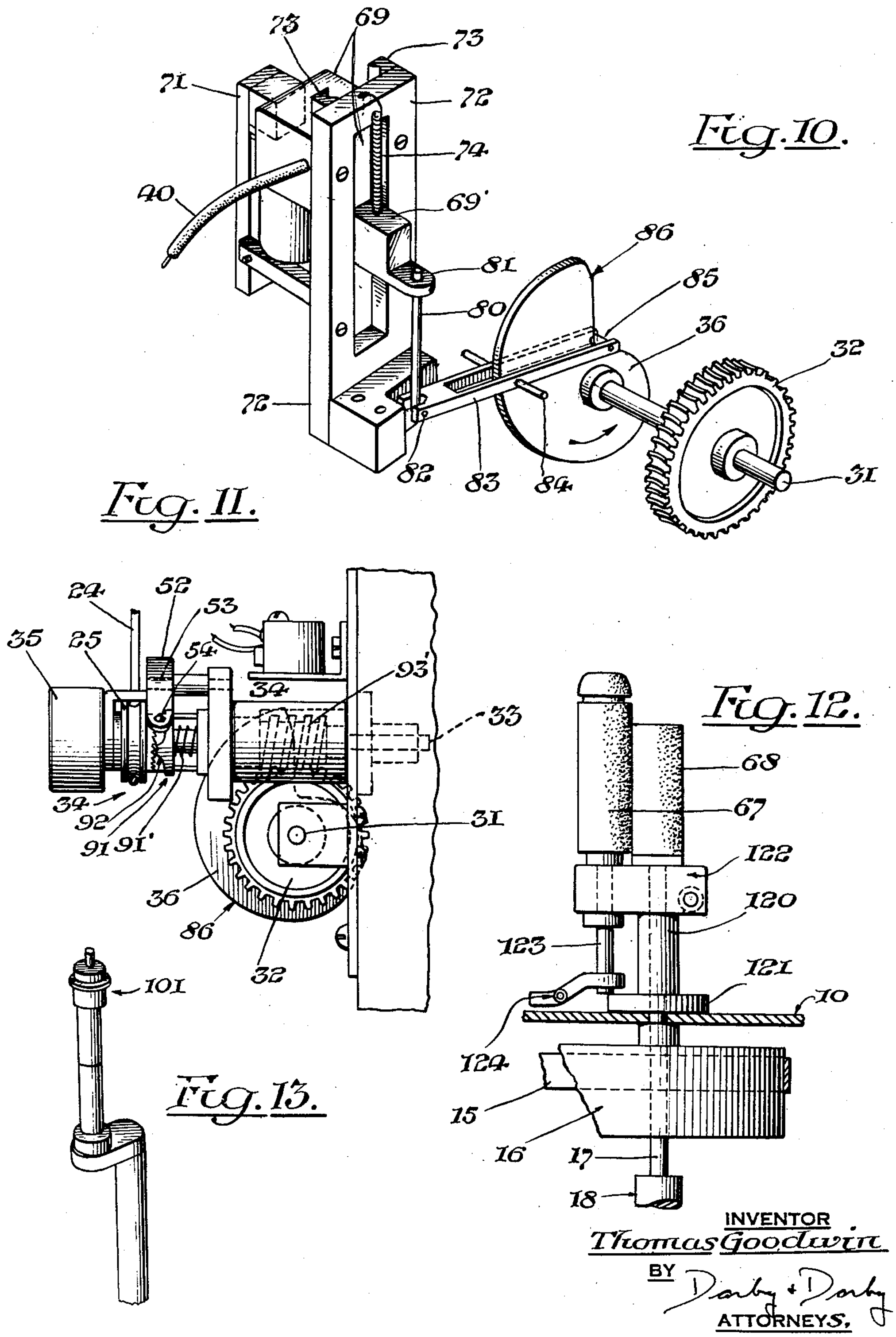
Figure 10 is a perspective view showing the relation between the head, pivot point on the chassis, and the cam mechanism used to select the desired track for recording or playing back.
Figure 11 is a side elevation of the clutch mechanism seen in Figure 2 showing the relation of the flywheel, worm gear, and cam used for selecting the desired sound track.
Figure 12 is a detached side elevation of the drive rollers used to pull the tape off the inside of the roll past the head and feed the tape to the outside of the continuous loop essentially as illustrated in Figure 6.
Figure 13 is a perspective view of a guide roller employed to receive tape as it passes through the head.

The mount and drive for tape drive roller 67 and 68 is shown in Figure 12 where shaft 17 which is driven by the motor 13 is shown to serve as the coupling unit between flywheel 16 and pulley 18 and roller 67 and 68, so that the motor which is the prime mover for the unit provides a synchronous drive for the several elements. It is desirable, therefore, in a working embodiment of the invention that the motor be of a constant speed variety, regardless of the load, because constant linear speed of tape through rollers is essential to an accurate and faithful reproduction of the sound record on the tape.

*Reproducing head and cam drive mechanism therefor*

In Figure 3 there is shown a section through a portion of the apparatus wherein the reproducing head, tape, guide rollers, tape reel, and the connection between the reproducing head and the cam mechanism for selecting a particular sound track is shown.

Briefly head 69 runs on the support 72 guided by tracks 73. Spring 74 provides a return tension for the head 69. It will be seen from the construction that support 72 is mounted outwardly from the chassis 10 and extends through a central aperture in the inclined portion thereof.

Linkage is provided between the head 69 and the cam used for selecting the sound track through arm 80 pinned at one extremity 81 to the head, and at its other extremity 82 to a lever 83, which in turn is pivoted on the chassis at 84. Roller 85 on the extreme end of lever 83 engages cam 86 and rides thereon. The latter cam is mounted properly on the chassis in a plane substantially perpendicular to the chassis itself, as can be seen by identification of the cam in Figure 1 where it is shown in a plane perpendicular to the plane of the drawing. The cam mounted on shaft 31 is of a general involute outline and it will be observed that by causing it to rotate counterclockwise roller 85 will follow the cam outline and, through its pivot point at 84, draw the reproducing head along track 73 in support 72 a distance proportional to the amount of rotation of the cam. Upon completion of a revolution of the cam, roller 85 will be returned sharply to its starting point. Coupling or shifting from one sound track on the tape to the next is preferably direct and linear to make the change quick and the means by which the coupling is arranged so that a predetermined amount of rotation of the cam is obtained to cause the head to move a specific distance will appear.

Reference to Figure 10 will show in a developed perspective form the linkage connecting the head and the cam. In Figure 10 the cam is in the same position which it occupies in Figure 3. Thus pressure pad 71 and reproducing head 69 are seen on support 72 with tracks 73. The cable connection 40 from the head is also shown.

As it appears in Figure 10, support 72 is in the form of an open structure through which an arm 69′ extends from the head to pivot point 81 for a linkage to the cam. Arm 80, pivoted at point 82, connects with arm 83, which in turn pivots at 84 which point is on the chassis itself. The arm 83 will be seen to be bifurcated in form having roller 85 mounted across the end of the bifurcation to ride on the edge 86 of cam 36. Shaft 31 on which the cam is mounted is shown in the figure.

From the showing of Figure 10 it will be clear that rotation of cam 36 in the direction indicated by the arrow will cause the bifurcated arm 83 to pivot at point 84, moving point 82 downwardly and thereby correspondingly moving the head 69 and pressure pad 71.

*The cam drive and clutch mechanism*

The means by which the head is made to move along its track a perpendicular amount to pick up a desired track along the tape traveling through the head is best illustrated by reference to Figures 7 and 11, read in conjunction with Figures 4 and 1. Thus, in Figure 1 motor 13 is shown driving belt 15 and flywheel 16, thereby driving shaft 17 and pulley 18 which carries belt 24, which in turn engages pulley 25. Flywheel 35 and worm gear 93′ are carried by shaft 33 which carries the mechanism for engaging and disengaging the gear drive for the cam.

The structure mounted on shaft 33 constitutes the linear coupling between the driving mechanism, the cam and the playback head. Thus on shaft 33 there is a flywheel 35 and clutch 91 engaged by solenoid activated trip lever arm 52. Also on the shaft the worm gear housing 93 is mounted, wherein a worm 93′ meshes with gear 32 which is mounted on shaft 31 with the cam 36 to form the linear coupling for the worm gear drive. A specific ratio between the worm 93′ and driven gear 32 is provided so that for a single revolution of shaft 33 carrying worm gear a definite integral fraction of a revolution will be completed by driven gear 32.

*Additional details of structure*

In Figure 6 wherein the path of a continuous loop of tape from the inside of the roll to the outside is shown, the tape 60 passes around guide roller 101, contacts the second guide roller 100, passes into the head 69, to which it is held by pressure pad 71 and then is taken by rollers 67—68 to be passed out over guide 66 and through ring 65 to be stored on the outside of the tape roll.

Figures 4, 5:
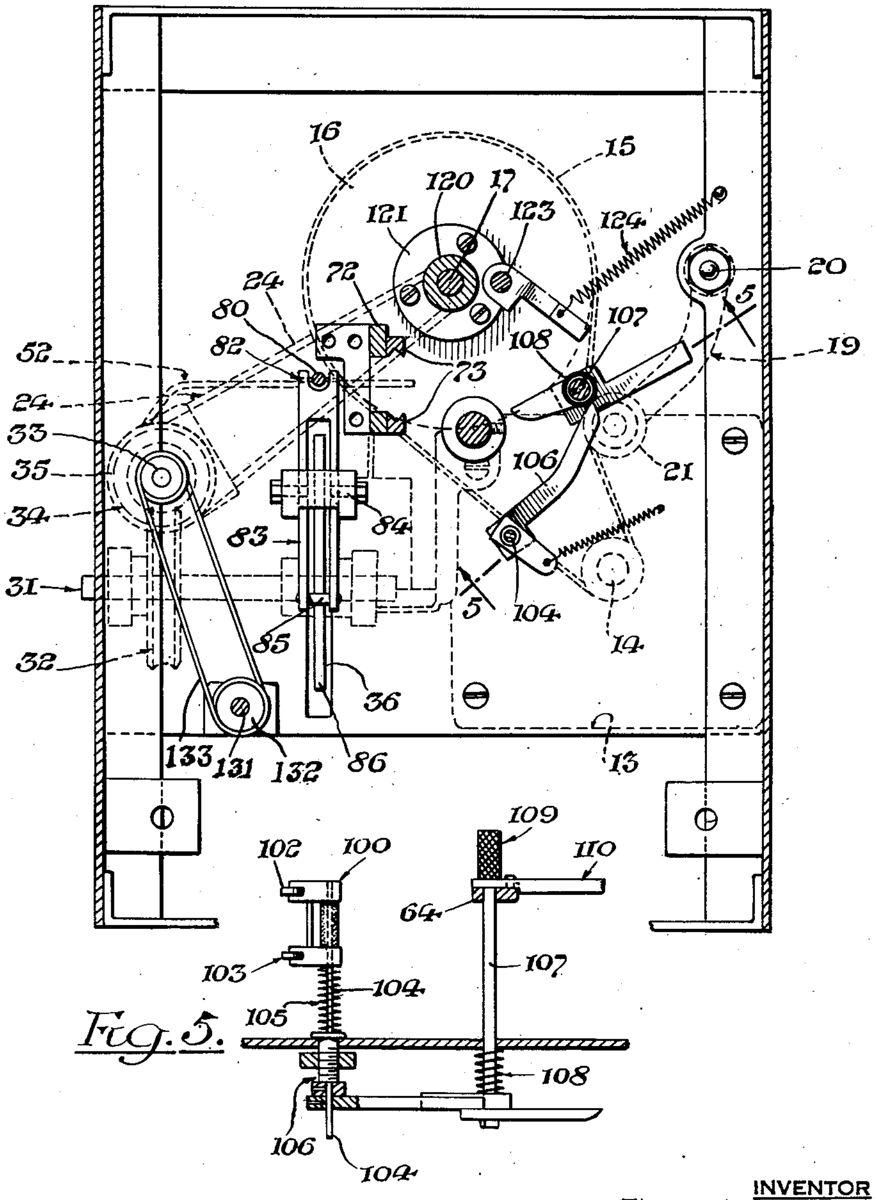
Figure 4 is a section taken along the line 4—4 in Figure 3, showing the relative positioning of the driving portion, the cam portion and the head with relation to that portion of the chassis.
Figure 5 is a partial section taken along the line 5—5 in Figure 4, showing the positioning of several elements of the driving and tape guiding mechanism which include a hand control for the tripping mechanism.

The details of construction of the guide and contact roller 100 are shown in Figures 5 and 6, together with some additional details of the device. Thus it will be seen that guide roller 100 comprises a pair of smaller rollers 102 and 103, mounted on a spindle 104 and oriented by a spring 105, which mechanism is in turn fastened to the chassis by support 106. Spring 105 serves to apply a rotational force to the structure 100 to keep rollers 102 and 103 in close contact with the tape. Electrical connection is made between these rollers and the solenoid control 30 so that upon completion of an electric circuit between the rolls the solenoid is activated to shift the head.

Rod 107 is spring mounted by means of spring 108 on the chassis and is provided with a knurled knob 109 carrying arm 110, which rides over ring 64 and serves as a retaining arm for the tape.

The details of the guide roller 100 thus indicate that the spring tension is such as to cause the small rollers 102 and 103 to keep the tape in close contact with the reproducing head 69 as it passes therethrough.

In Figure 12 is shown a detail of the drive rollers 67 and 68. These are normally friction rollers which will be made of a rubber composition so that the tape passing thereover is positively engaged and moved forward. Thus roller 68 is the driven roller mounted on a continuation of shaft 17 coming through the back of the chassis. Bearing 120 is mounted on chassis 10 by flange 121 and carries boss 122, which in turn mounts the bearing and shaft 123 for roller 67 to provide positive engagement between the two rollers. A spring 124 is pivoted on the chassis and tension applied thereto in a direction to cause it to bear on roller 68.

*Operation of the device*

From the foregoing description of the construction and arrangements of parts, the operation of the device is clear but the sequence of steps is as follows:

Upon the connection of the drive motor 13 to a power supply, shaft 14 commences rotation and synchronously brings about rotation of a corresponding series of parts. Thus belt 15 drives flywheel 16, which in turn drives shaft 17, pulley 18 and belt 24. With the rotation of shaft 17, roller 68 is also driven causing tape 60 to commence passage between the rollers 67, 68 by being drawn from the inside of the continuous loop and stored back on the outside.

Belt 24 transmits motive power to shaft 33 which carries pulley 25 and worm gear 93′, which in turn meshes with driven gear 32. However, no rotation of the shaft 33 is brought about because arm 52 engages clutch 91 and keeps it separated from pulley 25 and thereby prevents rotation of shaft 33. When the arm 52 is in the position shown in Figure 1 the engaging tooth 54 thereof fits closely into the tooth 92 of the clutch 91, causing it to ride back against spring 91′ (Figure 11), thereby eliminating engagement between the pulley 25, clutch 91, shaft 33 and the worm gear 93'. In Figure 11, the clutch mechanism is shown immediately after engagement. That is arm 52 has been tripped to release tooth 92 and permit engagement of clutch 91 and pulley 25.

Upon the completion of the passage of a certain amount of tape through the guide rollers as indicated by the passage of a conductive carbon mark over the contact rollers 102 and 103, the appropriate electrical signal is transmitted to the solenoid relay 30, which is tripped and pivots arm 52 about point 53, shifting tooth 54 out of engagement with clutch member 91, causing it to engage the pulley 25, whereby flywheel 35 makes a single turn which is transmitted to the worm 93', while arm 52 reengages the clutch and shifts it out of engagement upon the completion of the one revolution.

The single revolution thus transmitted to the worm 93' depending upon the gear ratio established, will cause gear 32 to complete that fraction of a single revolution, in turn, rotating cam 36 the corresponding amount. With this rotation of cam 36, roller 85 forming a follower on arm 83, moves a corresponding amount on that involute curve of the cam, thereby moving head 69 from the completed track to the adjacent track to be played or to be recorded. In one embodiment of the invention the ratio of worm to gears has been made 40 to 1 so that gear 32 with the completion of each cycle rotates 9°. Thereby a single cycle for the cam permits the utilization of 40 tracks on a single tape film. That is, the amount of rotation of the cam is related to the size of tape used and the number of tracks to be employed.

The advantages of the invention thus are apparent in that a standard 35 millimeter tape can be used and by recording the intelligence in a narrow strip on the tape, a large number of tracks may be put on the single strip. In one actual embodiment it has been possible to put 40 tracks on a 35 millimeter tape. By allowing for a rather high rate of speed of the passage of the tape through the machine, continuous play or recording for a period of 24 hours is easily accomplished.

Knurled handle 130, which appears in Figure 2, is connected by shaft 131, pulley 132 and belt 133 to pulley 33 to provide for hand setting the device to a selected track.

Because the recording of a piece such as an opera could have various scenes or acts identified by their position on a specific track, manual operation of the clutch and the solenoid by which the head can be indexed across the tape to the specific track desired omits the complications involved in looking for the appropriate material in a lengthy recording on a single strand of wire or tape.

Though the invention has been described in some detail with respect to the single embodiment disclosed herewith, it should be understood that variations thereto, altering the physical arrangement and combinations of parts may be accomplished without departing from the spirit or scope of the invention, as set forth in the appended claims.

What is claimed is:

1. A continuous tape recording and playback unit comprising a base, means for mounting a continuous loop of tape on said base, said tape providing for a plurality of sound tracks thereon, driving and guiding rollers for feeding said tape from one side of said loop through a reproducing head to the other side of said loop, and a connection from said head to synchronous means activatable to move the head from one sound track to an adjacent one upon passage of a predetermined length of tape through said head, said synchronous connection including a lever connected to said head, a second lever pivoted on said base, connection between said first and second levers, a cam disk having an involute form of outline contacting the other end of said pivoted lever, and a synchronous clutch comprising a shaft mounted on said base carrying a pulley for receiving motive power and a worm gear, a driven gear engaged thereby and mounted on a shaft carrying said cam disk, a pair of clutching surfaces the one rotatable with said pulley in a fixed plane of rotation and the other clutching surface engageable and disengageable therewith through axial movement thereof, said movable clutching element carrying a detent and a cam surface thereon, a pivoted arm mounted in a plane in fixed relation to said clutching surface rotatable in a fixed plane, said arm engaging the movable clutching element for causing engagement and disengagement by axial movement thereof whereby the clutch drives the cam disk through said gears.

2. In a recording and playback unit comprising a base, a motor on said base, coupling from said motor to tape driving rolls, and a reproducing head mounted in playing relation to said tape driving rolls, an improved head shifting mechanism comprising, a shaft carrying a flywheel, a pulley on said shaft, connection from said pulley to said motor, a clutch including a pair of toothed clutching elements, one rotatable with said pulley in a fixed plane of rotation, the other clutching element being engageable and disengageable therewith through axial movement thereof, a detent and cam track on said movable clutching element, an arm pivoted on said base in a plane in fixed relation to said clutching element rotatable in a fixed plane, said pivoted arm engaging said axially movable clutching element on said cam track, a shaft carrying said axially movable clutching element and a worm, a driven gear meshing with said worm, a shaft driven by said driven gear, an involute form of cam disk carried by said driven shaft, a lever pivoted on said base in the plane of said disk one end of said lever contacting the periphery of said disk, the other being connected to said playing head, and electrical connection from contacts to a solenoid for activating said pivoted arm, whereby said arm may be lifted out of contact with said detent thereby to permit engagement of the clutching elements to bring about a single revolution thereof and a rotation of said cam disk through a fraction of a revolution determined by said worm gear ratio.

References Cited in the file of this patent

UNITED STATES PATENTS

| Number | Name | Date |
|---|---|---|
| 1,186,924 | McNeel | June 13, 1916 |
| 1,631,137 | Kincade | June 7, 1927 |
| 2,168,529 | Konishi | Aug. 8, 1939 |
| 2,232,486 | Smith | Feb. 18, 1941 |
| 2,292,856 | Woolf | Aug. 11, 1942 |
| 2,323,215 | Gilmon | June 29, 1943 |
| 2,468,198 | Heller | Apr. 26, 1949 |